United States Patent [19]
Hehl

[11] Patent Number: 5,261,807
[45] Date of Patent: Nov. 16, 1993

[54] PLASTICIZING ASSEMBLY FOR USE IN AN INJECTION MOLDING MACHINE

[76] Inventor: Karl Hehl, Arthur-Hehl-Strasse 32, D-7298 Lossburg 1, Fed. Rep. of Germany

[21] Appl. No.: 840,194

[22] Filed: Feb. 24, 1992

[30] Foreign Application Priority Data

Feb. 23, 1991 [DE] Fed. Rep. of Germany ....... 4105730
Sep. 12, 1991 [DE] Fed. Rep. of Germany ....... 4130287

[51] Int. Cl.⁵ .............................................. B29C 45/17
[52] U.S. Cl. ................... 425/192 R; 425/205; 425/209; 425/562; 425/564
[58] Field of Search ............... 425/190, 191, 192 R, 425/205, 208, 209, 376.1, 382.3, 382.4, 562, 564, 565, 566

[56] References Cited

U.S. PATENT DOCUMENTS

| 2,579,809 | 12/1951 | Fellows et al. | 425/565 |
| 4,154,536 | 5/1979 | Sokolow | 366/90 |
| 4,808,103 | 2/1989 | Hehl | 425/564 |
| 4,842,507 | 6/1989 | Kawaguchi et al. | 425/382.4 |
| 4,886,439 | 12/1989 | Hehl | 425/190 |
| 4,909,720 | 3/1990 | Lomberg | 425/190 |
| 5,182,118 | 1/1993 | Hehl | 425/564 |

FOREIGN PATENT DOCUMENTS

| 1042226 | 10/1958 | Fed. Rep. of Germany | 425/564 |
| 1529938 | 11/1971 | Fed. Rep. of Germany . | |
| 2255162 | 7/1975 | France . | |
| 38-18976 | 9/1963 | Japan | 425/564 |
| 3-121823 | 5/1991 | Japan . | |
| 1023900 | 3/1966 | United Kingdom | 425/564 |

OTHER PUBLICATIONS

Plastverarbeiter, 41st year, 1990, No. 8, p. 114.

Primary Examiner—Scott Bushey
Attorney, Agent, or Firm—Spencer, Frank & Schneider

[57] ABSTRACT

In a plasticizing assembly for use in an injection molding machine, which assembly has a high-pressure chamber and a low-pressure chamber, which contains the feed screw, and a plurality of fixing screws disposed on a circular line, a connecting sleeve is provided, which partly surrounds the plasticizing cylinder or a rear section of a bipartite plasticizing cylinder and surrounds also the nozzle body or a forward section of a bipartite plasticizing cylinder in part of its length and is secured to the plasticizing cylinder or to its rear section. The fixing screws are screwed in and axially supported in tapped bores of the connecting sleeve and at their end faces bear on abutment faces of the nozzle body or of the forward section of the plasticizing cylinder. As a result, a replacement of the nozzle body or of the forward section of the plasticizing cylinder can be effected in a simpler manner and more quickly and will require lower physical forces and a simpler implement and it is possible to supply energy at a higher rate.

24 Claims, 9 Drawing Sheets

PLASTICIZING ASSEMBLY FOR USE IN AN INJECTION MOLDING MACHINE

BACKGROUND OF THE INVENTION

1. Field of the Invention

This invention relates to a heatable plasticizing assembly for use in an injection molding machine, which assembly comprises a heatable nozzle body, a rotatable feed screw, and a plasticizing cylinder defining a high-pressure chamber and a cylinder low-pressure chamber, which contains said feed screw, which is provided at its forward end with a back flow valve, wherein the high-pressure chamber comprises a cylindrical portion and is continued in the nozzle body by an axially extending portion tapering from said cylindrical portion to the diameter of the nozzle passage, and said cylinder and nozzle body are connected by a plurality of fixing screws disposed on a circular line.

The term "high-pressure chamber" describes a chamber which is disposed in front of the back flow valve and during the injection of molten plastic material into the injection mold is hermetically sealed from the low-pressure chamber by said valve. The high-pressure chamber has the largest volume when the feed screw is in its rearmost position. That rearmost position differs from an actual rear position of the feed screw, which actual rear position is determined by the quantity of plastic material required for a given molding to be made.

2. Description of the Prior Art

A plasticizing assembly of the type described first hereinbefore is known from the periodical "Plastverarbeiter", 41th Year 1990, No. 8, page 114.

In conventional plasticizing assemblies the gap between the nozzle body and the plasticizing cylinder adjoins the high-pressure chamber along the inside peripheral surface of the plasticizing cylinder. That gap is exposed on its inside to the pressure in the high-pressure chamber during the injection of the plastic material and its length is relatively large because it is determined by the inside diameter of the high-pressure chamber. Pressures up to and above 2500 bars may occur in the high-pressure chamber during the injection stroke and will be applied to said gap. In order to ensure a sufficiently tight seal between the nozzle body and the plasticizing cylinder, the contact pressure between the rear end face of the nozzle body and the forward end face of the plasticizing cylinder must be very high. Under that high contact pressure, the screw threads of the relatively long fixing screws are axially forced strongly against the internal screw threads in the tapped bores of the nozzle body and of the plasticizing cylinder.

Prolonged injection molding operations may cause the side faces of the screw threads to stick together owing to the high temperatures to which said screw threads are subjected in the nozzle body and in the plasticizing cylinder. In recent times, it is frequently required to make injection moldings meeting special requirements from materials or mixtures which can be injection-molded only with difficulty. Some of said materials and mixtures tend to release corrosive gases under the extremely high pressure in the high-pressure chamber and said gases enter the gap between the nozzle body and the plasticizing cylinder and reach the screw threads of the fixing screws. At the high temperatures prevailing, such gases may cause the screws to stick more firmly in the tapped bores as a result of corrosion so that it may be difficult to loosen the screws in the tapped bores when this is desired for a replacement of the nozzle body. Such difficulties will be serious because the nozzle body must be replaced rather often for cleaning and repairs and the injection molding operation must often be interrupted for repairs.

U.S. Pat. No. 4,886,439 suggests to connect the nozzle body to the plasticizing cylinder by means of a sleeve, which is adapted to be screw-connected to the plasticizing cylinder and applies an axial pressure to the nozzle body. In that case the nozzle body need not be formed with screw threads, which would give rise to difficulties. On the other hand, the force required to loosen the connecting sleeve is much stronger than the force required to loosen each screw of the plasticizing cylinder described first hereinbefore. Practice has shown that such a connecting sleeve can be loosened only with the aid of a heavy implement consisting, e.g., of a fork spanner, and it is often necessary to strike against the implement in order to loosen said sleeve. Besides, it is often necessary to replace the nozzle body in the premises of the user of the injection molding machine and to have that operation performed by personnel of such user or by service technicians of the manufacturer of the machine. A replacement of the nozzle will give rise to problems particularly when properly skilled labor and proper implements are not available or when it is necessary to transport heavy implements to remote sites of injection molding machines, e.g., in countries which are not highly developed industrially.

In known plasticizing cylinders the effective length of the feed screw usually does not exceed 20 times the diameter of said screw. On the other hand it is often desired to increase the production rate of the injection molding machine by a supply of heat at a higher rate to the plasticized plastic material. In known injection molding machines this can be accomplished only by a supply of a higher electric power to the heating cuffs although the power which can thus be supplied cannot be increased indiscriminately.

SUMMARY OF THE INVENTION

It is an object of the invention to provide a plasticizing assembly which is of the kind described hereinbefore and which permits the nozzle body or a forward section of a bipartite plasticizing cylinder to be replaced more quickly and in a simpler manner and with smaller physical forces and by means of a simpler implement and which permits energy to be supplied at a higher rate to the plastic material.

In a plasticizing assembly which is of the kind described first hereinbefore that object is accomplished in that a connecting sleeve is secured to the plasticizing cylinder and surrounds the plasticizing cylinder adjacent to the forward portion of the high-pressure chamber and axially overlaps the nozzle body or a forward section of a bipartite plasticizing cylinder in part of its length, and the fixing screws which are axially supported by the screw threads of tapped bores of the connecting sleeve have end faces bearing on abutment faces of the nozzle body or of the forward section.

In that plasticizing assembly the screw threads by which the fixing screws force the nozzle body or the forward cylinder section against the plasticizing cylinder are screwed in the internal screw threads of the tapped bores of the connecting sleeve and are remote from those portions of the nozzle body and the plasticizing cylinder which are heated to critically high temperatures. In that case the screw-threaded joint connecting the connecting sleeve and the plasticizing cylinder is not eliminated for a replacement of the nozzle and constitutes a heat transfer bridge but the temperature adjacent to the fixing screws is far below the temperatures in the nozzle body and the plasticizing cylinder. Besides, the screw threads of the fixing screws are stressed in a much smaller length than the screw threads of the fixing screws of the known plasticizing assembly of the kind described first hereinbefore and an ingress of any corrosive gases evolved from the plasticized plastic material as far as to the screw threads of the fixing screws is virtually precluded so that the interengaging screw threads cannot stick together.

As a result, the nozzle body and the forward cylinder section can be replaced by an exertion of a much smaller physical force and by means of an implement which is light in weight and can easily be handled, particularly because the contact pressure which is required for a tight seal is applied by means of a large number of fixing screws so that the manual force which is exerted on the implement is distributed to a large number of fixing screws and the implement which is required can be carried along by the technician, e.g., in a briefcase or in a small ba.

According to a preferred feature of the invention each of the confronting end faces of the nozzle body and of the plasticizing cylinder is finish-machined only in a relatively small annular area, which adjoins the inside peripheral surface of the plasticizing cylinder, respectively.

According to another preferred feature of the invention the nozzle body has such a length that the high-pressure chamber is entirely surrounded by the nozzle body regardless of the position of the feed screw and the gap between the end faces on which the nozzle body and the plasticizing cylinder are forced against each other adjoins the low-pressure chamber.

According to a further preferred feature of the invention the nozzle body is relatively short and the assembly consisting of the nozzle body and the plasticizing cylinder has the same shape as an assembly consisting of a plasticizing cylinder and a relatively long nozzle body, the relatively short nozzle body terminates on the rear of the sealing plane of the back flow valve when the feed screw is in its foremost position, and the relatively long nozzle body terminates behind the sealing plane of the back flow valve when the feed screw is in its rearmost position.

In the plasticizing assemblies which embody the three last-mentioned preferred features, much lower contact pressures will be required for a tight seal between the finish-machined end faces of the nozzle body or of the forward cylinder section, on the one hand, and of the plasticizing cylinder or its rear section, on the other hand, because said contact surfaces are relatively small or the nozzle body is so long that it entirely surrounds the high-pressure chamber regardless of the position of the feed screw so that the gap between the nozzle body and the plasticizing cylinder will always adjoin the low-pressure chamber. As a result, the replacement of the nozzle will be further facilitated because much lower contact forces are required to ensure a tight seal so that the stresses in the interengaging screw threads will also be reduced.

In that case the manufacturer of the plasticizing assembly can offer the same in one embodiment comprising a relatively short nozzle body and in another embodiment comprising a relatively long nozzle body. The manufacture of said two embodiments will not involve substantially higher costs because they can be manufactured as modular assemblies comprising only a few required to ensure a tight seal so that the stresses different components so that only a relatively small number of components must be kept in stock and may be provided with the same heating means, nozzle valve means and other control means.

If such modular assemblies are provided, the plasticizing cylinder may comprise rear and forward cylinder sections and the forward cylinder section may be connected to the rear cylinder section by means which are similar to those connecting the nozzle body to the forward cylinder section. In that case too the fact that the nozzle body can easily be detached will be an advantage. In such an assembly comprising a bipartite plasticizing cylinder the plastic material will be plasticized and homogenized to a higher degree because it flows along a longer path so that moldings of higher quality can be made, particularly because the longer plasticizing cylinder permits more kinetic or thermal energy to be supplied to the plastic material.

According to a preferred feature of the invention the forward cylinder section of the bipartite plasticizing cylinder is provided at its forward end with means for connecting said forward cylinder section to said nozzle body, the rear cylinder section of the bipartite plasticizing cylinder is provided at its forward end with similar means adapted to connect said nozzle body to said rear cylinder section, and said nozzle body is provided with connecting means for connecting said nozzle body selectively to said connecting means of said forward cylinder section and to said connecting means of said rear cylinder section. In that case the nozzle body can be detached from the forward cylinder section and another nozzle body can e mounted on the forward cylinder section or the forward cylinder section may be omitted and the same nozzle body or a different one may be mounted on the rear cylinder section, which now constitutes the entire plasticizing cylinder. Alternatively, an integral nozzle body may be used, which has a length that is equal to the total length of the nozzle body and the forward cylinder section previously employed.

According to a preferred feature of the invention the forward and rear cylinder sections are provided at corresponding positions with bores which open on the outside peripheral surface o the plasticizing cylinder and are adapted to receive means such as temperature sensors and a valve needle.

According to a preferred feature of the invention the plasticizing assembly comprises a valve needle for sealing the nozzle passage of the nozzle block and means for actuating said valve needle, which actuating means comprise a lever, which is pivoted to said rear cylinder section on a pivotal axis, a forward actuating rod, which is pivoted to said lever at a distance from said pivotal axis and is rigidly connected to said valve needle, and a rear actuating rod, which is pivoted to said pivoted lever at a distance from said pivotal axis, and said valve needle extends through a needle-guiding bore in said forward cylinder section, and when said nozzle body is directly mounted on said rear cylinder section said valve needle extends through a needle-guiding bore in said rear cylinder section, said forward actuating rod is shorter than the one used in the plasticizing assembly comprising said forward cylinder section, said lever is shorter than the one used in the plasticizing assembly comprising the forward cylinder section, and said rear actuating rod is pivoted to said lever at the same distance from said first pivotal axis as in the plasticizing assembly comprising said forward cylinder section. In that case only two components of the actuating means must be changed for a conversion of an assembly comprising a forward cylinder section to one in which said forward cylinder section has been omitted, whereas the same heating means, valve means and other control means can be used in both embodiments.

According to a preferred feature of the invention the feed screw contained in the bipartite plasticizing cylinder extends also in the forward cylinder section and the arrangement is such that the contacting end faces of the forward and rear cylinder section adjoin the low-pressure chamber regardless of the position of the feed screw.

According to a preferred feature of the invention the feed screw contained in the bipartite plasticizing cylinder is provided with at least one feed screw extension, which is provided on the rear with a stem which is similar to the stem of the back flow valve and extends into a socket of the feed screw or of another feed screw extension and each of said extensions is formed in its forward end face with a socket for receiving the stem of another extension or the stem of the back flow valve. Said extension or one of said extensions may consist of a mixing member, which may comprise mixing disks, which extend at right angles to the axis of the plasticizing cylinder and have approximately the same diameter as the feed screw and are formed in their rims with grooves which are angularly offset in adjacent ones of said disks.

In such arrangements the total length of the feed screw assembly may be about 25 times the diameter of the feed screw.

The feed screw or feed screw assembly comprising the feed screw extensions may have a length which is about 25 times the diameter of the feed screw. The extensions may consist of screw sections or of mixing members. Regardless of the nature of a given extension, the provision of mating stems and sockets will ensure that the feed screw means can be increased in length in a simple manner in that the components of the feed screw assembly are connected by screw-threaded joints which are similar to the joint by which the back flow valve is connected to the feed screw means. In the feed screw assembly an extension consisting of a mixing member may be mounted directly on the feed screw proper or on a screwlike extension mounted on the feed screw proper.

By means of a feed screw extension consisting of a mixing member as described above, the plastic material can be more thoroughly mixed, e.g., in order to admix coloring materials. Whereas conventional mixing members often consist of mixing arms, the present mixing member comprises mixing disks which occupy almost the entire cross-section of the otherwise free space within the plasticizing cylinder. To nevertheless permit a thorough mixing and a feeding of the plastic material said mixing disks are formed in their rims with grooves, which are angularly offset on adjacent mixing disks so that said grooves are disposed on helical lines and permit the plastic material to pass through the mixing member in said grooves. The helix angle of the helix defined by said grooves is smaller than the helix angle of the feed screw so that the swirl imparted to the plastic material by the feed screw will inherently be distributed and a more intense mixing will thus be effected.

Besides, the gap between the forward and rear sections of the plasticizing cylinder is disposed sufficiently to the rear and always adjoins the low-pressure chamber even when the back flow valve has been retracted, usually by three times the diameter of the feed screw, to a rearmost position.

DETAILED DESCRIPTION OF THE PREFERRED EMBODIMENTS

Illustrative embodiments of the invention will now be described in detail with reference to the drawing.

During the injection molding operation, a feed screw 12 in the heated plasticizing cylinder 10 feeds the plasticized plastic material into a high-pressure chamber H in front of the feed screw 12 as the latter is yielding back. The feed screw 12 is then axially advanced to inject the plastic material through the nozzle passage 16 into an injection mold. During that forward stroke of the feed screw 12, a back flow valve mounted on the feed screw 12 at its forward end is effective to seal the continuously decreasing high-pressure chamber H from the low-pressure chamber N, which contains the feed screw 12. The high-pressure chamber H as a cylindrical rear portion extending in the plasticizing cylinder 10 and a forward portion, which tapers in the rear portion of the nozzle body 11 to the diameter of the nozzle passage 16 and merges into the latter. The nozzle body 11 and the plasticizing cylinder 10 or the forward section 14 of a bipartite plasticizing cylinder 10, 14 have finish-machined confronting end faces 11b and 14b or 10b and adjacent to said end faces the parts 10 and 11 are connected by a large number of angularly spaced apart fixing screws 21 disposed on a circular line. The forward section 14 is connected to the rear section 10 of the bipartite cylinder adjacent to finish-machined end faces by similar fixing screws 121 arranged on a circular line. Adjacent to the forward portion of the high-pressure chamber H the plasticizing cylinder 10 or the rear cylinder section 10 is surrounded by a connecting sleeve 23 or 123, which surrounds also the nozzle body 11 or the forward cylinder section 14 and is secured to the plasticizing cylinder 10 if it is integral or to the forward section 14 of a bipartite plasticizing cylinder 14, 10. To that end, internal screw threads of the connecting sleeve 23 or 123 are screwed onto and axially supported by external screw threads 10a' or 14a' of a flange 10a or 14a of the plasticizing cylinder 10 if it is integral or of the forward section 14 of a bipartite plasticizing cylinder. The fixing screws 21 and 121 extend at an angle of about 45° to the axis z—z of the cylinder and the fixing screws 21 extend through a radial flange 23a of the connecting sleeve 23 and are secured at internal threads 23b or 123b. The free end portions of the fixing screws 21 or 121 extend into recesses 11c or 14c formed in the nozzle body 11 or in the forward section 14 of a bipartite plasticizing cylinder (see FIGS. 6, 7 and 9, 10). The abutment faces 11c' and 14c' are disposed at the bottom of the recesses 11c and 14c.

The nozzle body 11 has a rear portion b (FIG. 2), which is larger in diameter than the forwardly adjoining portion and has a forwardly facing annular shoulder, which is in snug contact with an end face 23a' of the flange 23a. The end face 23a' is at right angles to the axis z—z of the cylinder. That portion b of the nozzle body 11 which is relatively large in diameter is surrounded in part of its length by an axial flange 10a of the plasticizing cylinder 10.

Figure 1:
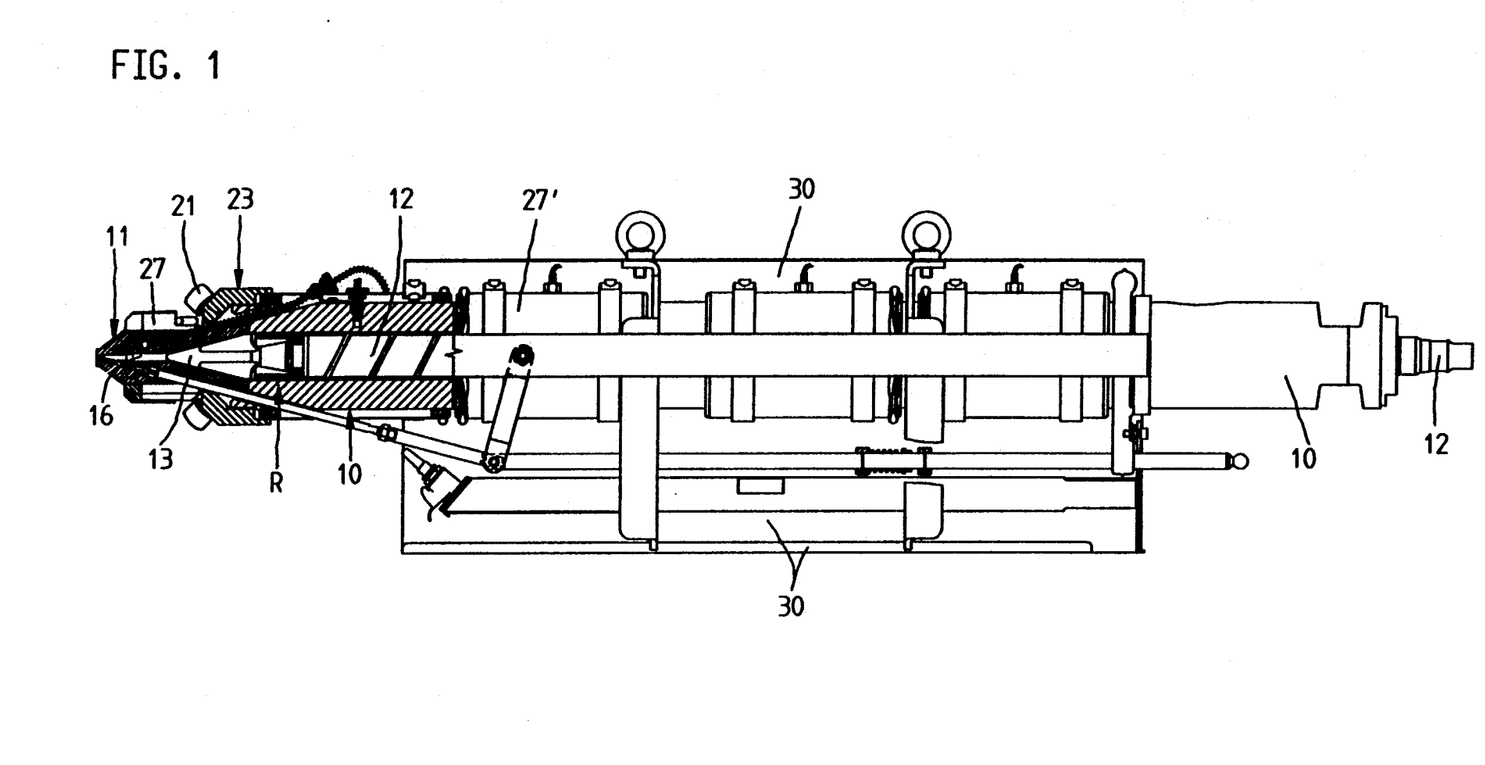
FIG. 1 is a side elevation showing partly in vertical section a plasticizing assembly comprising a plasticizing cylinder and a nozzle body.
Figure 2:
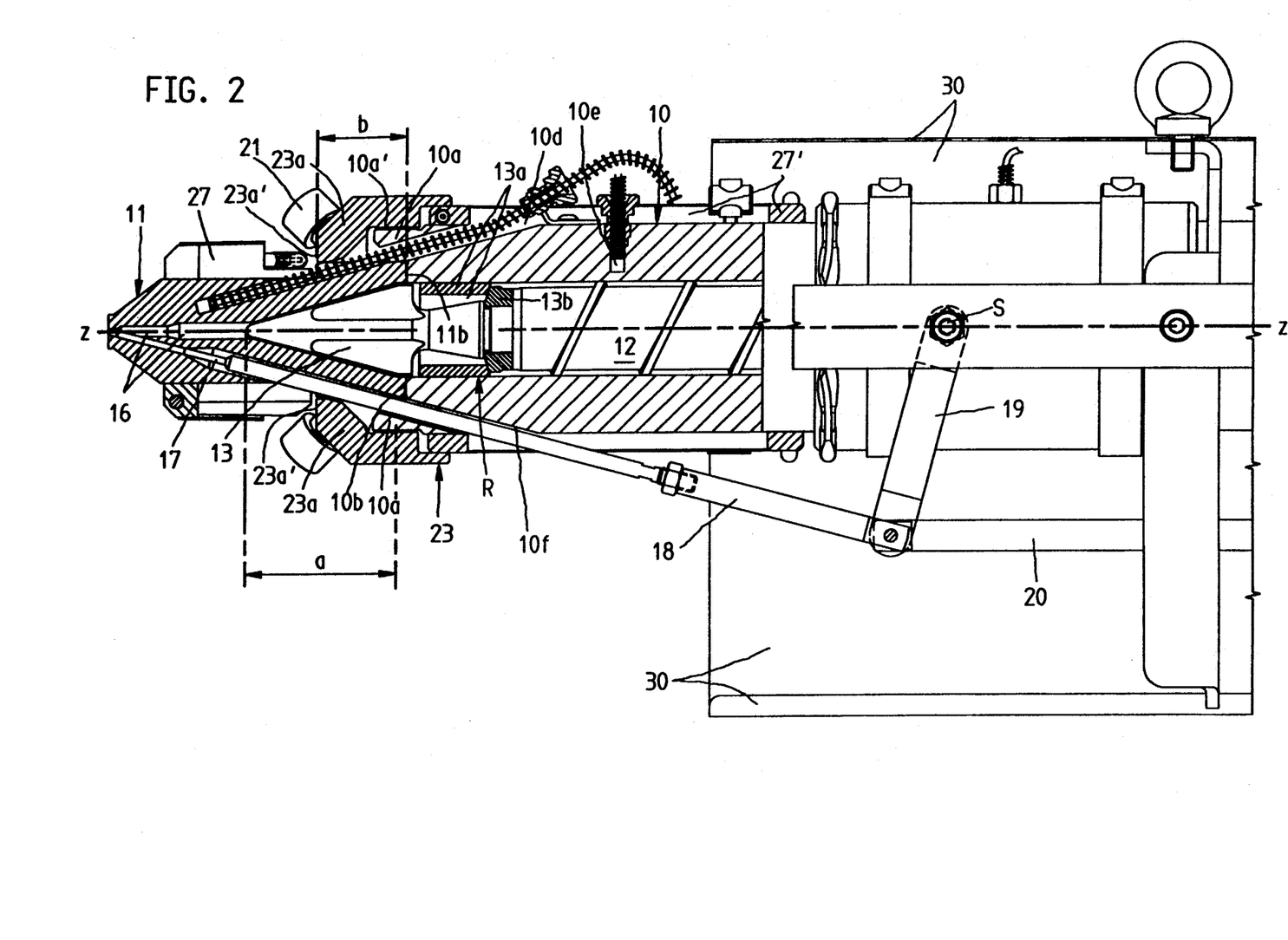
FIG. 2 is an enlarged fragmentary view showing a portion of FIG. 1.
Figure 3:
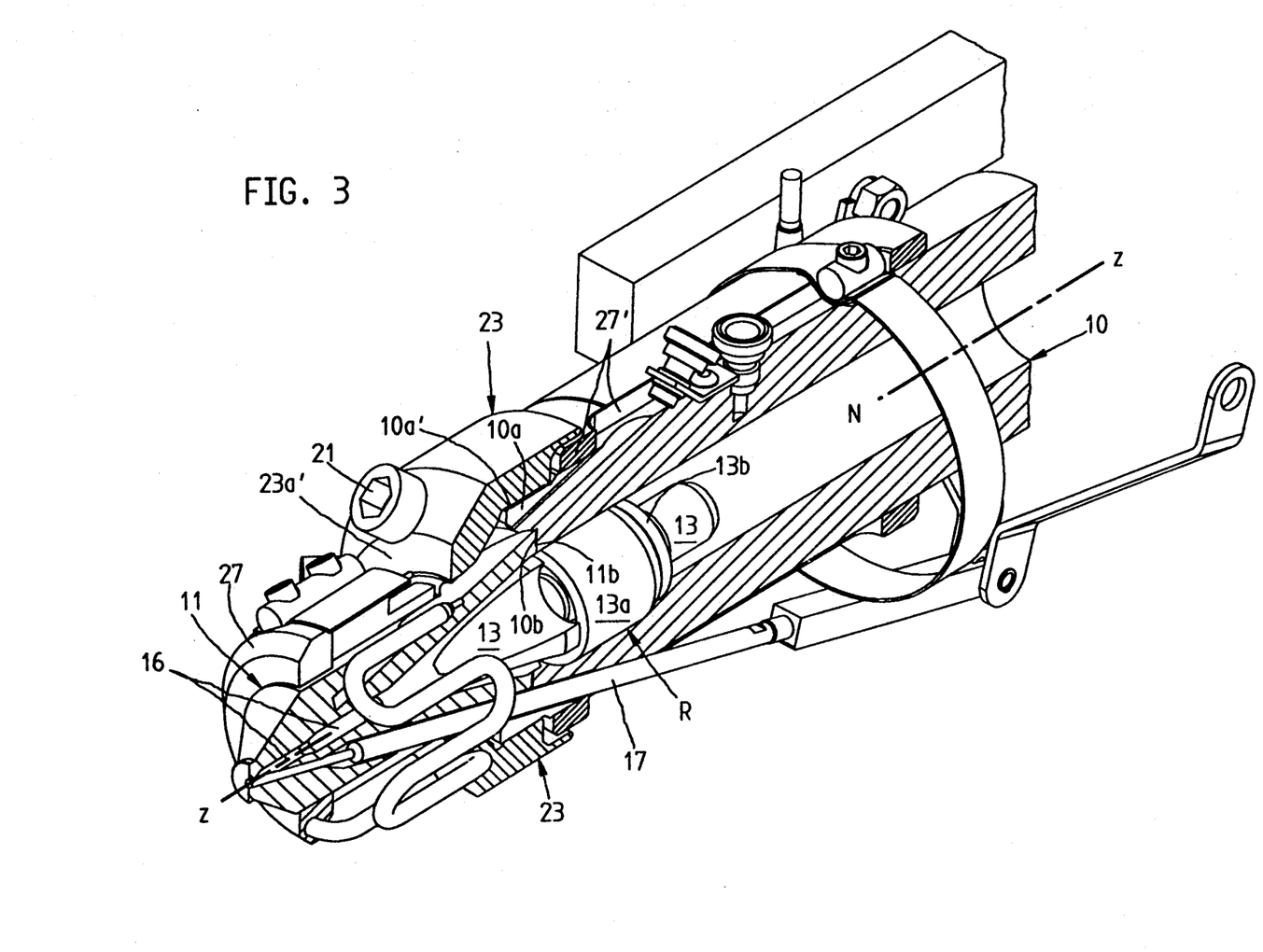
FIG. 3 is a perspective view showing the forward end portion of the plasticizing cylinder in vertical section.
Figure 4:
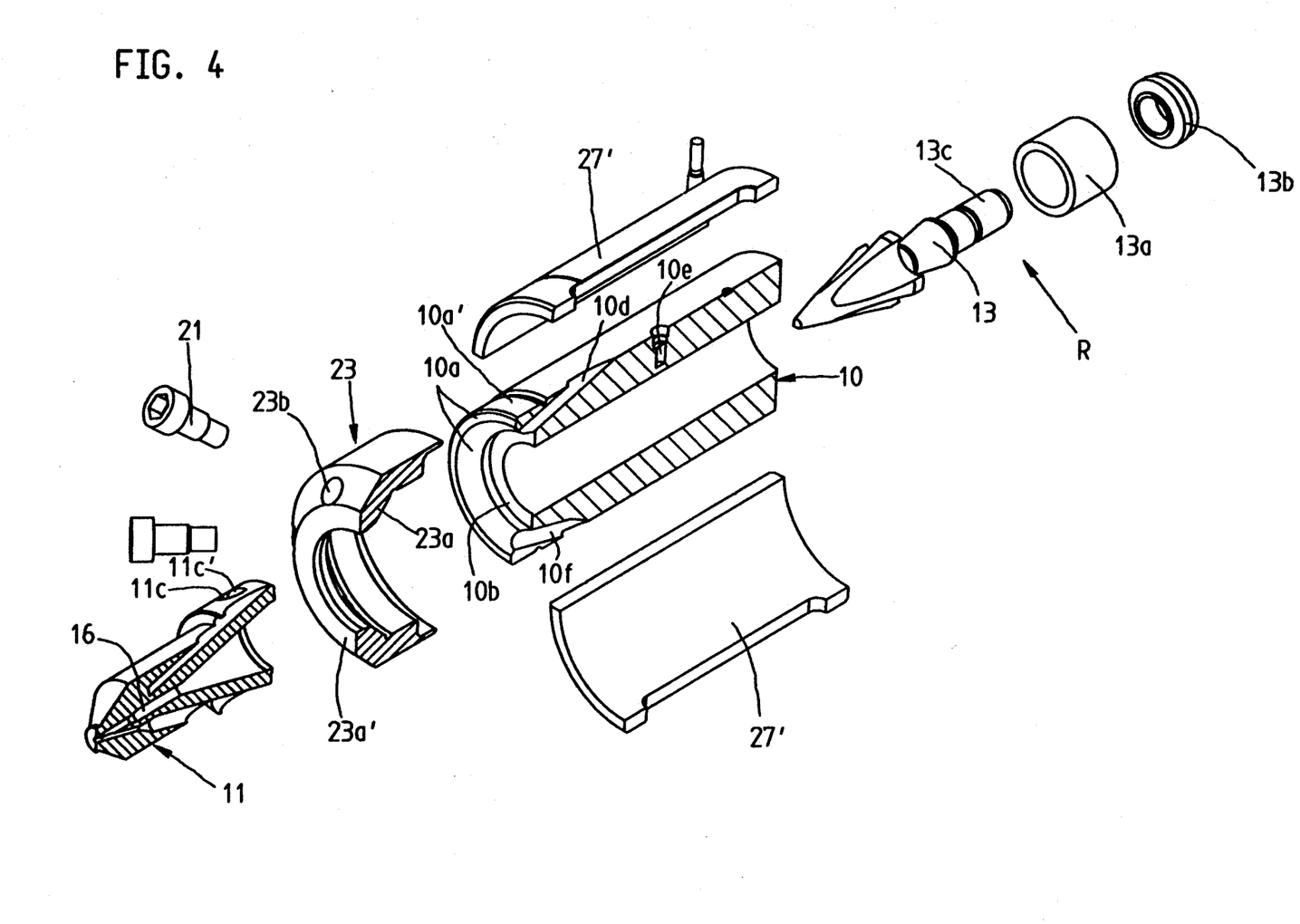
FIG. 4 is an exploded view showing partly in vertical section the forward end of the plasticizing cylinder, the nozzle body, the screw-threaded connecting sleeve, and the components of the back flow valve.
Figure 6:
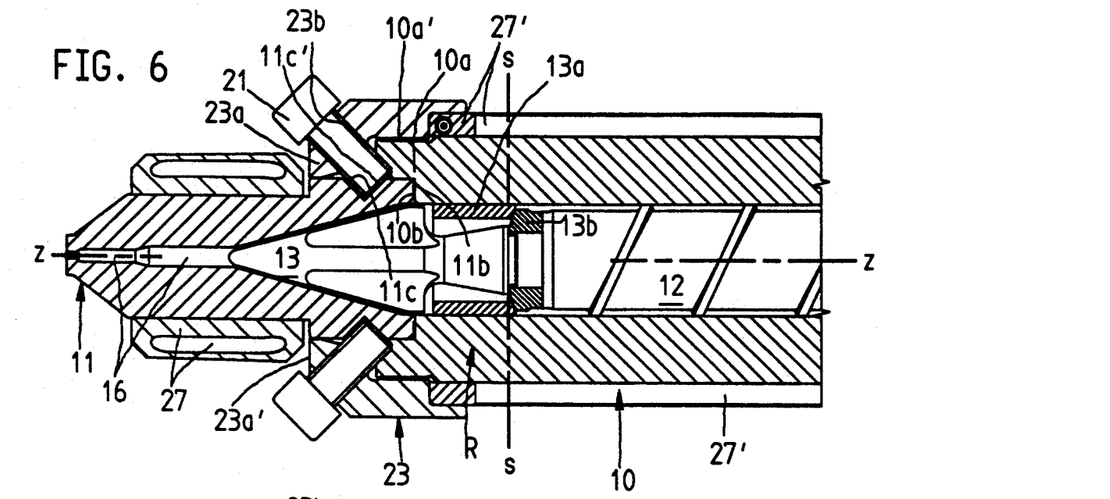
FIGS. 6 and 7 are fragmentary side elevations showing partly in vertical section the forward portion of the plasticizing assemblies shown in FIGS. 1 to 4 and in FIG. 5, respectively, but without a nozzle valve and valve-actuating means.
Figure 13:
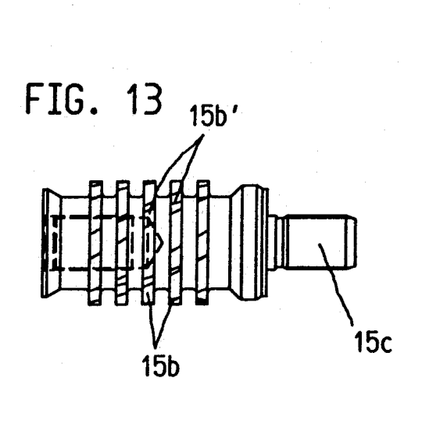
Figure 14:
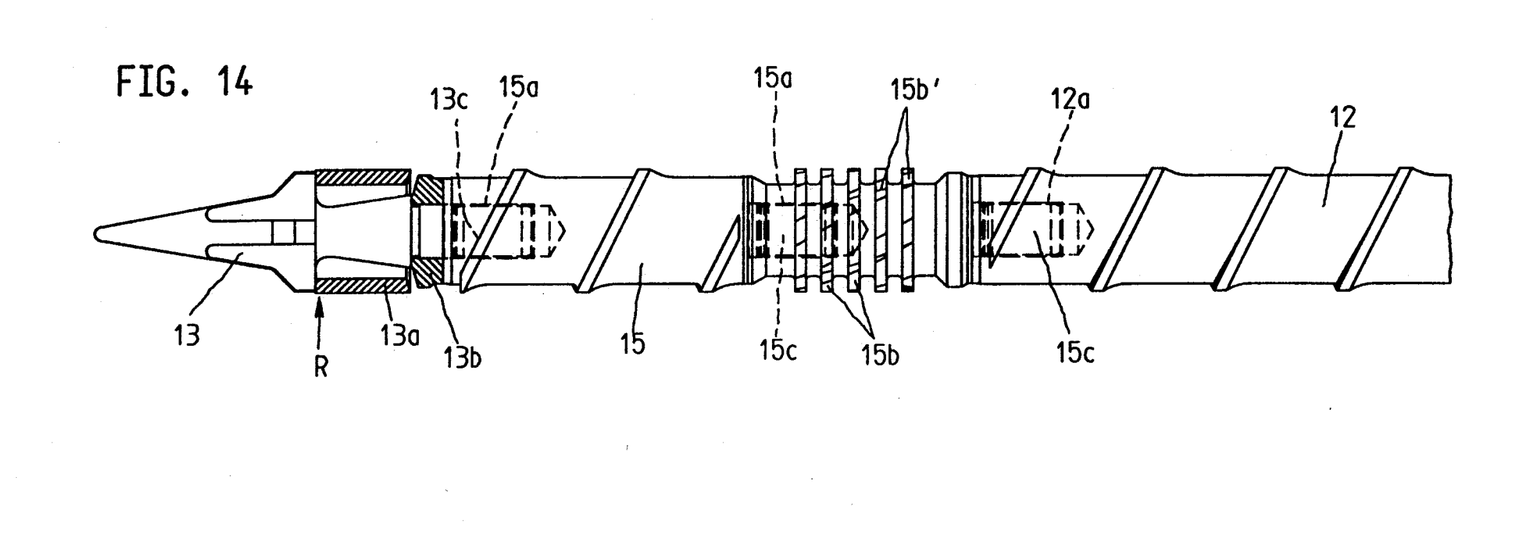
FIG. 14 shows a feed screw assembly composed of components shown in FIGS. 11 to 13.

The back flow valve R comprises an annular seat 13b, which is secured to the forward end face of the feed screw 12 or of the feed screw assembly which will be described hereinafter with reference to FIGS. 13 and 14, a head 13, which is connected by a stem 13c to the feed screw 12 or feed screw assembly and axially spaced from the seat 13b, and a sealing ring 13a, which is axially slidably mounted between the seat 13b and the head 13 and radially protrudes from the seat 13b. o prevent a back flow of the plastic material from the high-pressure chamber H, the sealing ring 13a is in sealing contact with a forward end face of the annular seat 13b, as is shown, e.g., in FIGS. 2 and 6.

In the embodiment shown in FIGS. 1 to 4 and 6 the length of the nozzle passage 16 is about one-half of the length of the nozzle body 11 so that when the feed screw 12 is in its foremost position the rear end of the nozzle body 11 is disposed adjacent to the forward edge of the sealing ring 13a of the back flow valve R, i.e., in front of the sealing plane s—s (FIG. 6) of the back flow valve.

In the further embodiment shown in FIGS. and 7 the nozzle body 111 is so long that the high-pressure chamber H is surrounded by the nozzle body 111 throughout its length even when the feed screw 12 is in its rearmost position. As a result, the gap between the contacting end faces 111b and 110b of the nozzle body 111 and the plasticizing cylinder 110 adjoins the low-pressure chamber N. A sufficiently long nozzle body 111 can be provided without an increase in weight of the plasticizing assembly in that a cylindrical axial flange 111a, which extends to the rear from the portion b of the nozzle body 111, is an interference fit in a mating annular recess in the wall of the plasticizing cylinder 110. All differences between this embodiment and the one shown in FIGS. 1 to 4 and 6 have now been described. Identical parts of the two embodiments are designated by the same reference characters.

Figure 5:
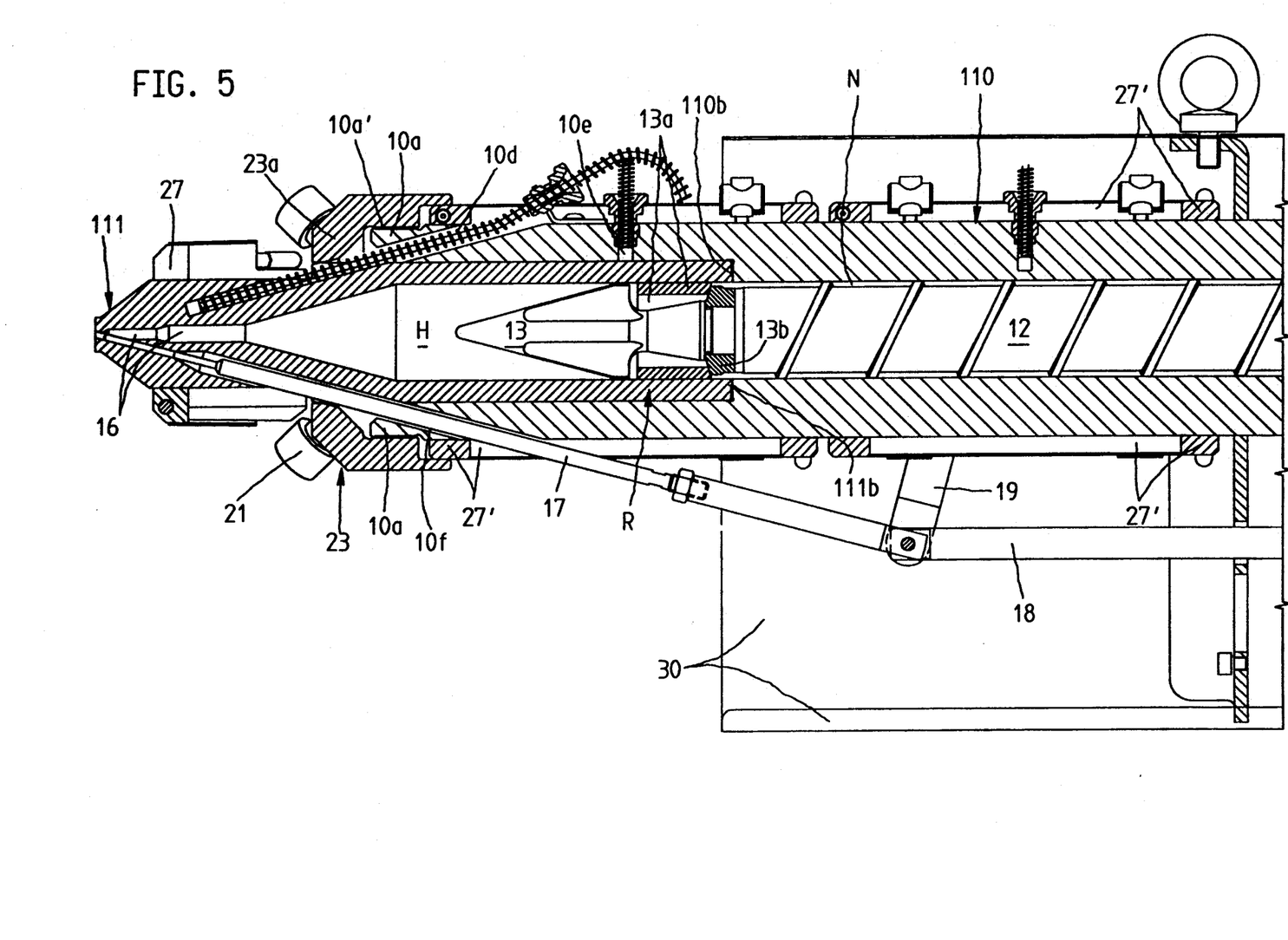
FIG. 5 is a view that is similar to FIG. 2 and shows another embodiment of the plasticizing assembly.
Figure 7:
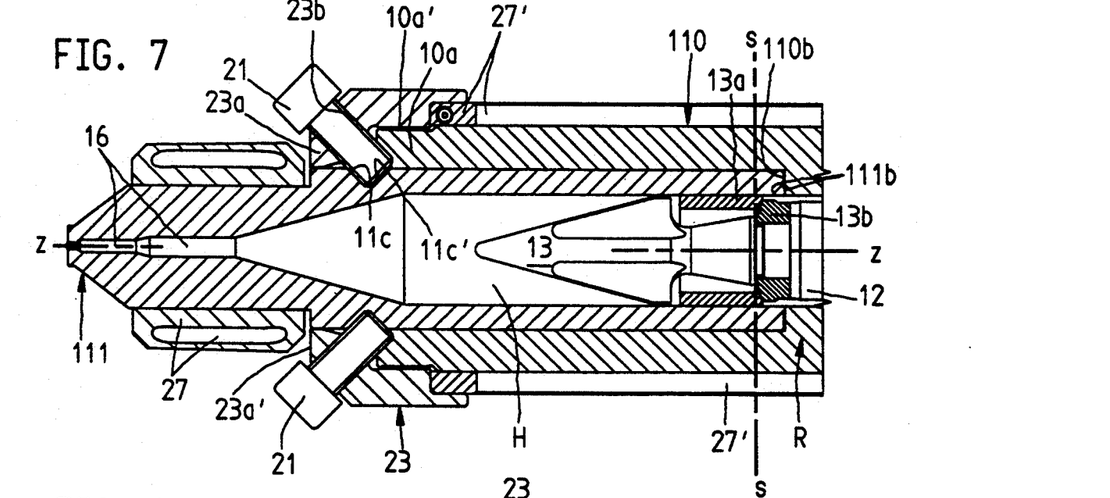
Figure 8:
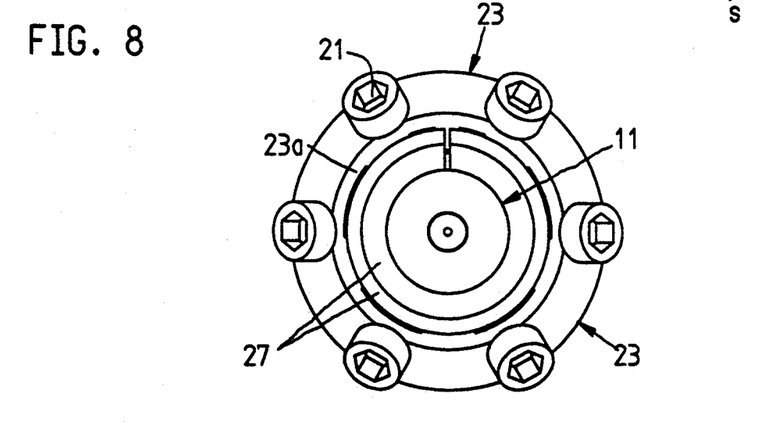
FIG. 8 is an end elevation showing the nozzle body, which is provided with a heating cuff, screw-threaded connecting socket and fixing screws.
Figure 9:
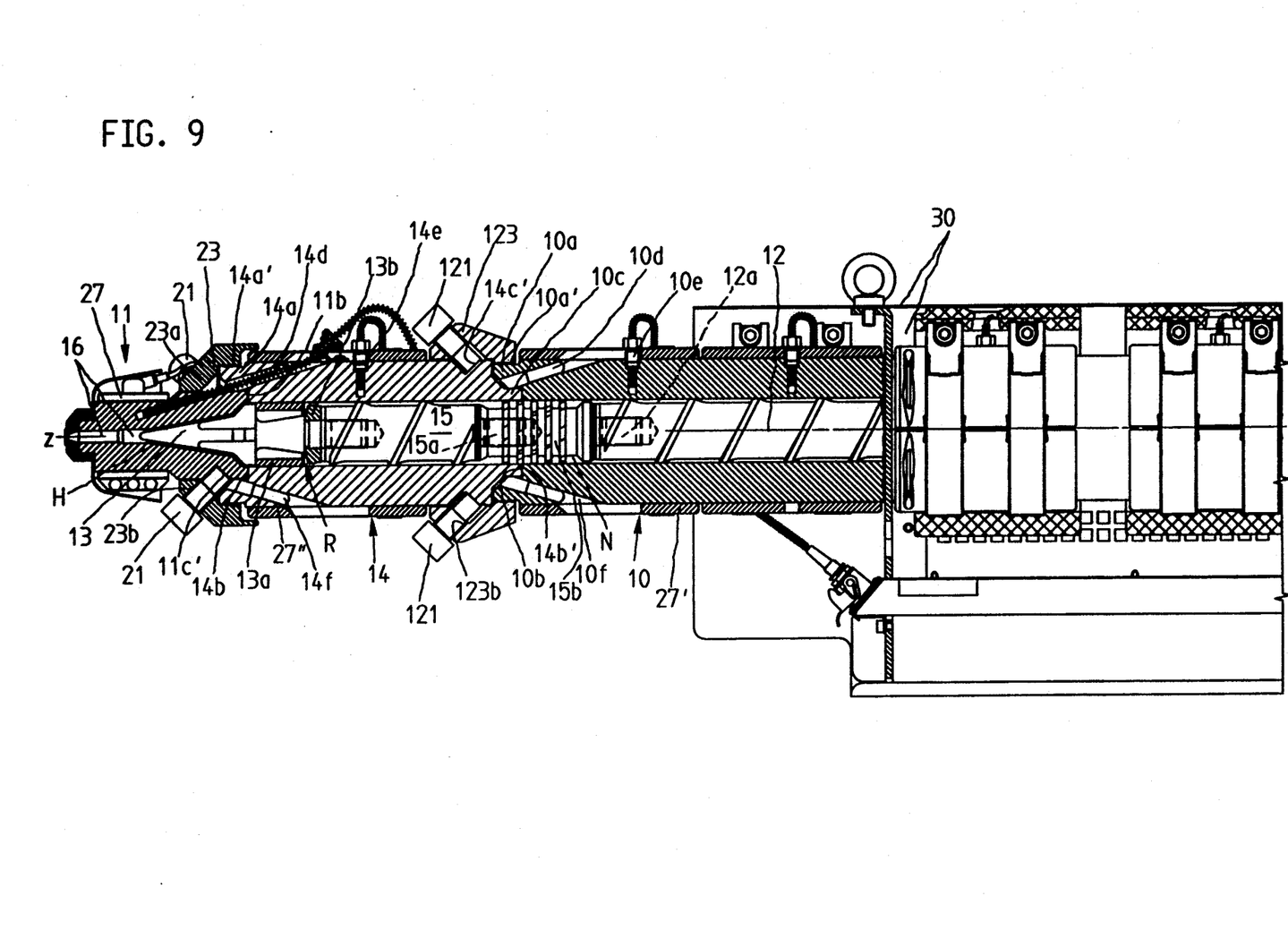
FIG. 9 is a side elevation showing patly in section the plasticizing assembly comprising a bipartite plasticizing cylinder.

An economical manufacture, the ease of service and the spare parts business will be promoted by the fact that in the embodiment shown in FIGS. 1 to 4 and 6 the assembly comprising a short nozzle body 11 and a plasticizing cylinder 10 has the same length and shape as the corresponding assembly 111, 110 shown in FIGS. 5 and 7 and comprising a longer nozzle body 111, the rear end of which is disposed behind the sealing plane s'—s' (FIG. 5) of the back flow valve R when the feed screw 12 is in its rearmost position.

An adequate seal of the gap between the nozzle body 11 or 111 and the plasticizing cylinder 10 or 110 in spite of a lower contact pressure can be ensured in that the contacting end faces 11b, 111b; 10b, 110b of the nozzle body 11; 111 and the plasticizing cylinder 10; 110 are finish-machined only in a small annular area, which adjoins the inside peripheral surface of the plasticizing cylinder 10; 110.

The length of the plasticizing assembly can be increased in that the plasticizing cylinder is bipartite and consists of a rear section 10 and a forward section 14, which is connected to the rear section by an additional connecting sleeve 123, which is screwed on the external screw threads 10a' of the flange 10a of the rear section 10 and is thus connected to the connecting means provided on the rear section 10. That additional connecting sleeve 123 surrounds the plasticizing rear section 10 adjacent to the low-pressure chamber N so that the gap between the end faces 14b', 10b will not adjoin the high-pressure space H even when the feed screw 12 is in its rearmost position.

The rear end portion of the forward section 14 is similar to the rear end portion of the nozzle body 11 in that the contacting end faces 10b and 14b' of the rear and forward sections of the plasticizing cylinder abut in a recess 10c of the forward end face 10b of the rear section 10 so that the cylinder space which accommodates the feed screw 12 is defined by a continuous peripheral surface. The forward section 14 is provided at its forward end with a flange 14a, which has external screw threads 14a' and a forward end face 14b. The external screw threads 14a' are screwed into the internal screw threads of the connecting sleeve 23, which is connected to the nozzle body 11 by the means described hereinbefore. Alternatively, the nozzle body may be integrally formed with the forward section of the bipartite plasticizing cylinder.

Figure 10:
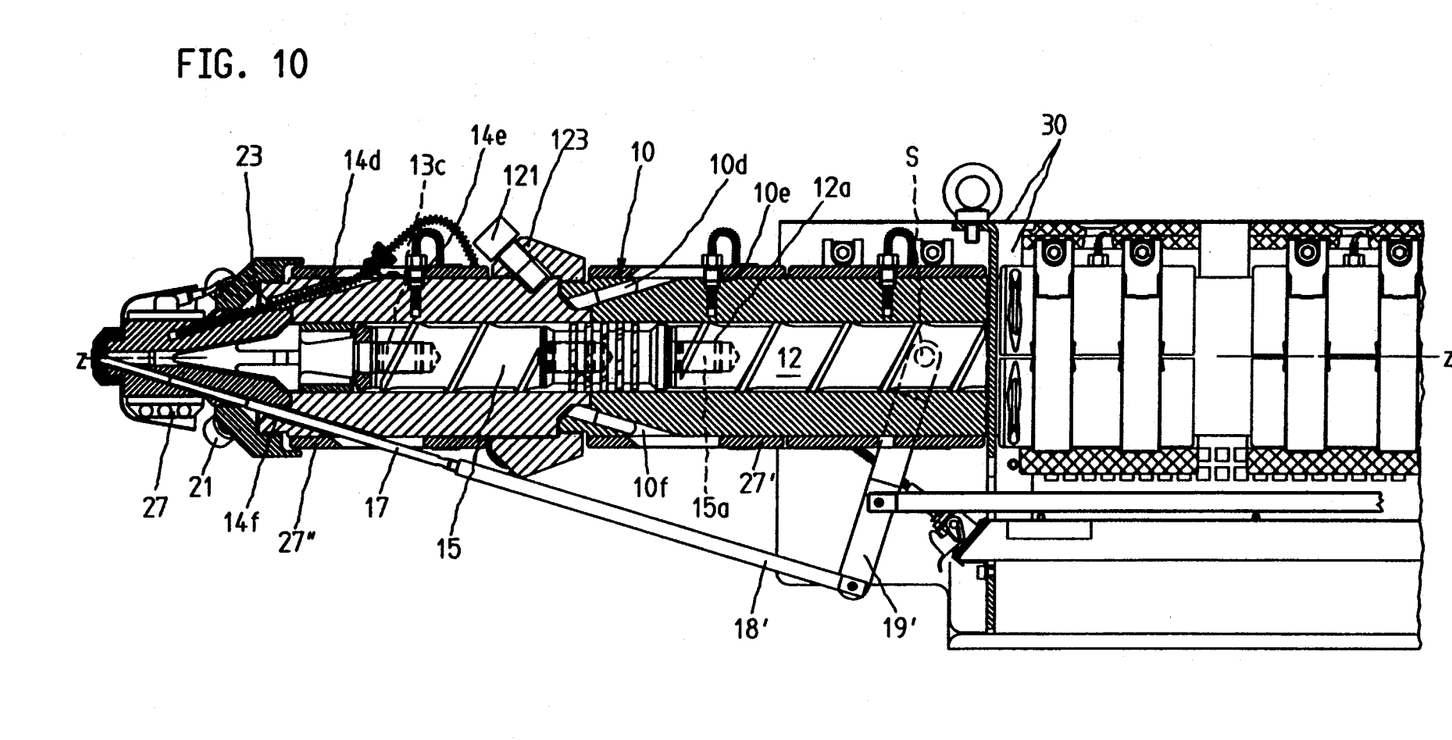
FIG. 10 is an elevation like FIG. 9 and shows a plasticizing assembly comprising a nozzle valve and valve-actuating means.
Figure 11:
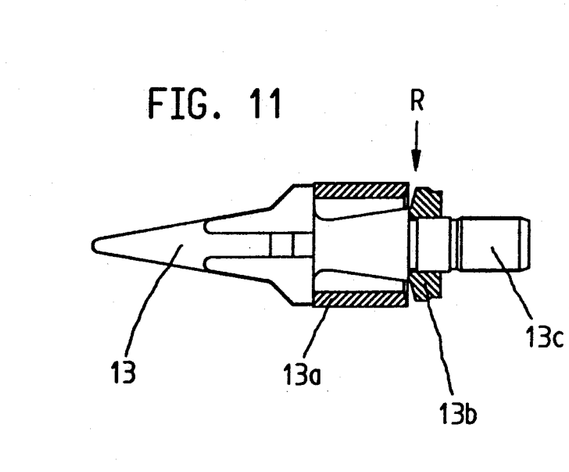
FIG. 11 is an enlarged view showing the back flow valve.
Figure 12:
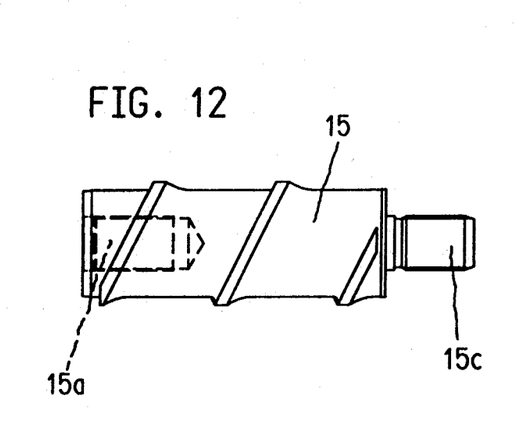
FIGS. 12 and 13 are enlarged views showing different forward sections of a bipartite plasticizing cylinder.

In the embodiment shown in FIG. 10 a nozzle body of the plasticizing assembly is provided with a nozzle valve. To permit the use of a nozzle valve whenever it is desired the rear section 10 and the forward section 14 of the bipartite plasticizing cylinder are provided each with bores 10d, 10e, 10f and 14d, 14e, 14f, respectively, which are not utilized in the arrangement of FIG. 9 and may be used to accommodate temperature sensors and a valve needle 17. As a result, the nozzle passage can be sealed by a valve needle regardless of the use of an integral plasticizing cylinder 10 or a bipartite plasticizing cylinder 10, 14. As is apparent from a comparison of FIGS. 2 and 10 it is sufficient in the arrangement shown in FIG. 10 to replace the lever 19 shown in FIG. 2 by the longer lever 19', to which the forward actuating rod 18' can be pivoted on a lower level than the forward actuating rod 18 in FIG. 2. The forward actuating rod 18' is loner than the forward actuating rod 18. In spite of that conversion, the rear actuating rod 20 is pivoted to the levers 19 and 19' at the same distance from the axis S on which the lever is pivoted to the plasticizing cylinder 10 or the rear section 10 thereof.

The longer plasticizing cylinder may accommodate either a longer feed screw or a feed screw assembly, which comprises a normal feed screw 12 and at least one feed screw extension 15. The feed screw assembly is longer than the feed screw 12 by five diameters of the feed screw 12 so that the length of the feed screw assembly is 25 times the diameter of the feed screw. Whereas the stem 14c of the back flow valve is normally held in the socket 12a in the forward end face of the feed screw 12, a similar stem of feed screw extension 15 may be fixed in said socket 12a. Each feed screw extension 15 is formed in its forward end face with a similar socket 15a, which is used to accommodate a stem 15c of a preceding feed screw extension 15 or the stem 13c of the back flow valve. The homogenizing and mixing action can be intensified in that the feed screw assembly comprises a feed screw extension which consists of a mixing member.

In the present embodiment the mixing member comprises mixing disks 15b, which extend at right angles to the axis z—z of the cylinder and have approximately the same diameter as the feed screw 12. To permit the plastic material to flow through the mixing disks, the latter are formed in their rims with grooves 15b' and the grooves 15b' of adjacent disks 15b are angularly offset so that the grooves 15b' are arranged on helices and the plasticized plastic material is forced forwardly from the feed screw 12 through said grooves. The helix angle of the helix on which said grooves are disposed is smaller than the helix angle of the feed screw 12 so that the swirl imparted to the plasticized plastic material by the feed screw 12 is interrupted in the mixing feed screw extension and the mixing action is thus intensified (FIG. 13).

Energy can be supplied to the plastic material in the plasticizing assembly not only by the heating cuffs 27 and 27' provided on the nozzle body 11 or 111 and the rear section 10 or 110 of the plasticizing cylinder but also by the heating cuff 27" on the forward section 14 of the plasticizing cylinder. The plasticizing cylinder 10 or 110 is surrounded by a protective guard 30.

In those embodiments showing the bipartite plasticizing cylinder it may be understood, that the plasticizing cylinder also could consist of more than only two parts, which may be connected in the same manner as the forward and the rearward parts of the plasticizing cylinder shown in the embodiments.

I claim:

1. In a plasticizing assembly for use in an injection molding machine for plastic materials, which assembly comprises
    a plasticizing cylinder having a forwardly facing surface and an inside peripheral surface defining a low-pressure chamber; and
    a nozzle body internally defining a nozzle passage and having a rearwardly facing surface and provided with heating means, said plasticizing cylinder and said nozzle body defining in front of said low-pressure chamber a high-pressure chamber, which has a cylindrical portion in said plasticizing cylinder and tapers in said nozzle body to the diameter of said nozzle passage and merges into said nozzle passage, said assembly further comprising feed screw means disposed in said low-pressure chamber and defining the rear end of said high-pressure chamber and movable along said plasticizing assembly between rearmost and foremost positions, and connecting means connecting said nozzle body to said plasticizing cylinder and comprising means defining a plurality of angularly spaced apart tapped bores, which are disposed on a circular line, and a plurality of fixing screws, which are screwed in and axially supported in respective ones of said tapped bores and are under initial stress to force said forwardly and rearwardly facing surfaces against each other under a contact pressure, the improvements wherein one of the parts consisting of said plasticizing cylinder and said nozzle body is formed with a plurality of angularly spaced apart abutment faces disposed on a circular line and facing away from the other of said parts, said connecting means comprise a connecting sleeve, which surrounds said plasticizing cylinder and said nozzle body adjacent to said forwardly and rearwardly facing surfaces and is connected to the other of said parts and is formed with said tapped bores, which consist of through bores open to respective ones of said abutment faces, and said fixing screws bear on respective ones of said abutment faces.

2. The improvement set forth in claim 1, wherein said one part consists of said nozzle body and said other part consists of said plasticizing cylinder.

3. The improvement set forth in claim 1, wherein said connecting sleeve comprises a radial flange, said other part is formed with a plurality of angularly spaced apart recesses, which are defined by said abutment faces, and said fixing screws extend at an angle to the axis of said cylinder through said radial flange.

4. The improvement set forth in claim 1, wherein said other part is formed with external screw threads and said connecting sleeve has internal screw threads screwed on said external screw threads.

5. The improvement as set forth in claim 1, wherein said feed screw means is provided at a forward end with a back flow valve comprising a sealing ring, said nozzle passage has approximately one-half of the length of said nozzle body, and said rearwardly facing surface of said nozzle body is axially adjacent to a forward end of said sealing ring when said feed screw means is in the foremost position.

6. The improvement set forth in claim 1, wherein said nozzle body extends axially into said plasticizing cylinder so that said forwardly and rearwardly facing surfaces adjoin said low-pressure chamber regardless of the position of said feed screw means and said high-pressure chamber is always entirely surrounded by said nozzle body.

7. The improvement set forth in claim 1, wherein said forwardly and rearwardly facing surfaces are finish-machined only in an annular area which adjoins said inside peripheral surface of said plasticizing cylinder.

8. The improvement set forth in claim 1, wherein
a valve needle for selectively sealing said nozzle passage is slidably mounted in a needle-guiding bore, which is formed in said nozzle body and opens into said nozzle passage,
said plasticizing cylinder is formed with a second bore, which is aligned with and communicates with said needle-guiding bore and
valve-actuating means are provided, which comprise a lever, which is pivoted to said plasticizing cylinder on a pivotal axis, a rear actuating rod, which is pivoted to said lever at a distance from said pivotal axis, and a forward actuating rod, which is pivoted to said lever at a distance from said pivotal axis and extends in said second bore and is rigid with said valve needle.

9. The improvement set forth in claim 1, wherein
said feed screw means is provided at the forward end with a back flow valve defining a sealing plane and p1 said nozzle body has a rear end arranged to be disposed in front of said sealing plane when said feed screw means is in the foremost position.

10. The improvement set forth in claim 1, wherein
said feed screw means is provided at the forward end with a back flow valve defining a sealing plane and
said nozzle body has a rear end arranged to be disposed behind said sealing plane when said feed screw means is in the rearmost position.

11. The improvement set forth in claim 1, wherein
said plasticizing cylinder comprises a rear cylinder section and a forward cylinder section, which is formed with said forwardly facing surface and with a second rearwardly facing surface,
said rear section is formed with a second forwardly facing surface,
one of said cylinder sections is formed with a plurality of second angularly spaced apart abutment faces disposed on a circular line and facing away from the other of said cylinder sections,
a second connecting sleeve is provided, which surrounds said cylinder sections adjacent to said second forwardly and rearwardly facing surfaces and is connected to said other cylinder section and is formed with a plurality of second angularly spaced apart through bores, which are open to respective ones of said second abutment faces, and
a plurality of second angularly spaced apart fixing screws are screwed in and axially supported in respective ones of said second tapped bores and under initial stress bear on respective ones of said abutment faces to force said second forwardly and rearwardly facing surfaces against each other under a contact pressure.

12. The improvement set forth in claim 11, wherein said one cylinder section consists of said rear section and said other cylinder section consists of said forward section.

13. The improvement set forth in claim 11, wherein
said second connecting sleeve comprises a second radial flange,
said other cylinder section is formed with a plurality of second angularly spaced apart recesses, which are defined by said second abutment faces, and
said fixing screws extend at an angle to the axis of said cylinder through said second radial flange.

14. The improvement set forth in claim 11, wherein
said other cylinder section is formed with external screw threads and
said connecting sleeve has internal screw threads screwed on said external screw threads of said other cylinder section.

15. The improvement set forth in claim 11, wherein
said rear cylinder section is formed at its forward end with a socket defined at its bottom with said second forwardly facing surface and
said forward section extends into said socket, and
said rear and forward sections have flush inside peripheral surfaces defining a space which accommodates said feed screw means.

16. The improvement set forth in claim 11, wherein said rear and forward cylinder sections are provided with similar bores for accommodating temperature sensors.

17. The improvement set forth in claim 11, wherein
a valve needle for selectively sealing said nozzle passage is slidably mounted in a needle-guiding bore, which is formed in said nozzle body and opens into said nozzle passage,
said forward section of said plasticizing cylinder is formed with a second bore, which is aligned with and communicates with said needle-guiding bore, and
valve-actuating means are provided, which comprise a lever, which is pivoted to said rear section of said plasticizing cylinder on a pivotal axis, a rear actuating rod, which is pivoted to said lever substantially at a predetermined distance from said pivotal axis, and a forward actuating rod, which is pivoted to said lever at a second distance from said pivotal axis and extends through said second bore and is rigid with said valve needle.

18. The improvement set forth in claim 17, wherein
said rear section of said plasticizing cylinder is formed with a third bore, which has the same inclination to the axis of said cylinder as said needle-guiding bore,
said nozzle body is connected directly to said rear section of said plasticizing cylinder so that said third bore is aligned with and communicates with said needle-guiding bore,
said lever is replaceable by a second lever, which is pivoted to said rear section of said plasticizing cylinder on said pivotal axis and is pivotal to said rear actuating rod substantially at said predetermined distance from said pivotal axis, and a second forward actuating rod which is rigid with said valve needle is pivotal to said second lever at a distance which is smaller than said second distance from said pivotal axis.

19. The improvement set forth in claim 17, wherein said second forwardly and rearwardly facing surfaces adjoin said low-pressure chamber regardless of the position of said feed screw means.

20. The improvement set forth in claim 19, wherein
said feed screw means comprise a feed screw formed at its forward end with a socket, and extension means comprising a rearwardly extending first stem, which is detachably mounted in said socket, and are formed at their forward end with a second socket, and
a back flow valve is provided, which has a rearwardly extending second stem, which is detachably mounted in said second socket.

21. The improvement set forth in claim 20, wherein said extension means comprise a feed screw extension consisting of a mixing member, comprising
a plurality of mixing disks, which are at right angles to the axis of said plasticizing cylinder and have approximately the same diameter as said feed screw and have rims formed with angularly spaced apart grooves, which are angularly offset in adjacent ones of said mixing disks.

22. The improvement set forth in claim 11, wherein
said forward and rear cylinder sections define said inside peripheral surface of said plasticizing cylinder and
said forwardly and rearwardly facing surfaces are finish-machined only in an annular area, which adjoins said inside peripheral surface.

23. The improvement set forth in claim 11, wherein all said tapped bores have identical screw threads and all said fixing screws have identical screw threads.

24. A kit of components for a plasticizing cylinder of an injection molding machine for plastic materials, which kit comprises
first and second plasticizing cylinders differing in length and having each a forwardly facing surface and an inside peripheral surface defining a low-pressure chamber, and
first and second nozzle bodies, which differ in length and each of which defines a nozzle passage and has a rearwardly facing surface and is provided with heating means, wherein
said first cylinder and said first nozzle body, or said second cylinder and said second nozzle body, are assembled to constitute respective plasticizing assemblies, which have the same length and in which said inside peripheral surface defines a low-pressure chamber and said cylinder and said nozzle body define in front of said low-pressure chamber a high-pressure chamber, which has a cylindrical portion in said plasticizing cylinder and tapers in said nozzle body to the diameter of said nozzle passage and merges into said nozzle body,
said kit also comprises feed screw means disposed in said low-pressure chamber so as to define the rear end of said high-pressure chamber and movable along said plasticizing assembly between rearmost and foremost positions, and
connecting means for connecting in each of said plasticizing assemblies said nozzle body to said plasticizing cylinder and comprising means defining a plurality of angularly spaced apart tapped bores, which are disposed on a circular line, and a plurality of fixing screws, which are screwed into and axially supported in respective ones of said tapped bores and under initial stress to force said forwardly facing and rearwardly facing surfaces against each other under a contact pressure,
one of said parts of each of said assemblies is formed with a plurality of angularly spaced apart abutment faces disposed on a circular line and facing away from the other of said parts of said assembly,
said connecting means comprise a connecting sleeve, which surrounds said cylinder and said nozzle body of each of said assemblies adjacent to said forwardly and rearwardly facing surfaces and is connected to the other of said parts of said assembly and is formed with said tapped bores, which consist of through bores open to respective ones of said abutment faces, and
said fixing screws bear on respective ones of said abutment faces.

* * * * *